United States Patent [19]

Leitermann et al.

[11] Patent Number: 4,934,764
[45] Date of Patent: Jun. 19, 1990

[54] COMPUTER SYSTEM MODULE ASSEMBLY

[75] Inventors: Richard E. Leitermann, Newton; Neal H. Marshall, Bolton; John C. Costello, Wellesley; Gianfranco D. Zaccai, Boston, all of Mass.

[73] Assignee: Kendall Square Research Corporation, Waltham, Mass.

[21] Appl. No.: 331,448

[22] Filed: Mar. 31, 1989

[51] Int. Cl.5 .......................................... F16B 12/00
[52] U.S. Cl. ..................................... 312/111; 312/109; 312/265.3
[58] Field of Search ............ 312/107, 108, 111, 265.1, 312/265.2, 265.3, 265.4, 265.5, 213, 250, 107.5, 109

[56] References Cited

U.S. PATENT DOCUMENTS

| | | | |
|---|---|---|---|
| 1,252,816 | 1/1918 | Kuehl | 312/107 |
| 3,032,831 | 5/1962 | Borg | 312/111 |
| 3,506,322 | 4/1970 | Richards | 312/213 |
| 3,754,805 | 8/1973 | Pangburn et al. | 312/111 |
| 3,955,863 | 5/1976 | Yellin | 312/108 |
| 4,056,295 | 11/1977 | Downing | 312/265.1 |
| 4,070,075 | 1/1978 | Morgan | 312/250 |
| 4,301,636 | 11/1981 | Luria | 312/111 X |
| 4,828,340 | 5/1989 | Jorgensen | 312/213 X |

FOREIGN PATENT DOCUMENTS 256683  8/1926  United Kingdom ............... 312/111

*Primary Examiner*—Joseph Falk
*Attorney, Agent, or Firm*—Lahive & Cockfield

[57] ABSTRACT

A computer system module assembly has modular equipment enclosures slidable and securable in a modular exoskeletal frame structure on a base. The frame structure includes horizontal frame members on which the enclosures slide with pawls movable on a threaded rod to engage studs on the enclosures to clamp the enclosure to the frame. Air cooling units in the enclosures provide independent cooling for each enclosure, moving air preferably from front to back of the enclosures, through perforated frame doors.

9 Claims, 10 Drawing Sheets

COMPUTER SYSTEM MODULE ASSEMBLY

BACKGROUND OF THE INVENTION

This invention relates to assemblies for computer systems, in which components of a computer system may be conveniently and efficiently housed in modular enclosures for insertion into a modular frame, which allows easy access to the components, efficient cooling of the components, and firm and convenient clamping of the enclosures to the frame.

The computer art has developed to the point where valuable systems may be constructed from the interconnection of numbers of processor units, data storage units, power supply units and other auxiliary units in a variety of mixtures. As one example, applicant provides systems in which a wide number of processor units and data storage units and power supply units may be accumulated and interconnected in a manner that provides dispersed data processing and storage in the units. The variety of combinations suggests that flexibility in physically assembling the components is desirable. Modular assembly of a computer system also offers advantages not possible in fixed, large units.

SUMMARY OF THE INVENTION

The invention consists of a modular computer frame assembly having a plurality of vertically stacked modular frame structures and a plurality of computer equipment-containing modular enclosures. Each frame structure has a plurality of exterior corner vertical structural members and at least one horizontal frame member secured to the exterior corner vertical structure members and extending horizontally therebetween. The horizontal frame members include means for slidably receiving and supporting the equipment enclosures. The assembly includes means for attachment of exterior corner vertical structural members to like corner vertical structural members above or below them. Each enclosure has enclosure engagement means and each horizontal frame member has frame engagement means, for mutual engagement to clamp the enclosure to the frame member.

Preferably the horizontal frame member includes means for guiding an enclosure during sliding engagement of the enclosure and the horizontal frame member, and the assembly includes a base secured to the vertically stacked frame structures, the base including lockable swivel casters, lockable to move in one direction only, and also including leveling pads located outwardly of the lockable swivel casters.

In one aspect of the invention, the enclosure has downwardly extending stud means, in the form of shoulder screws with tapered heads, and the horizontal frame member includes channel means for receiving the stud means. Preferably, the horizontal frame member engagement means includes movable pawl means located adjacent the channel means for engaging the stud means, the pawl means being mounted on an oppositely threaded portion of a rotatable rod, for movement to clamp the stud means when the rod is rotated, and means for rotating the rod at only one location on the rod.

In another aspect of the invention, at least one of the enclosures includes air circulating means for moving air through the enclosure to cool the computer-related equipment, in which the enclosure has a first open side through which air enters and a second open side through which air exhausts. Preferably, all of the second open sides are at the rear of the assembly, and the assembly includes perforated doors, pivotally mounted on the frame structures for the passage of air through them.

DESCRIPTION OF THE DRAWINGS

Other objects, characteristics, and advantages of the invention can be seen from the following description of a preferred embodiment, including the drawings thereof, in which.

DETAILED DESCRIPTION OF THE INVENTION

Figure 1:
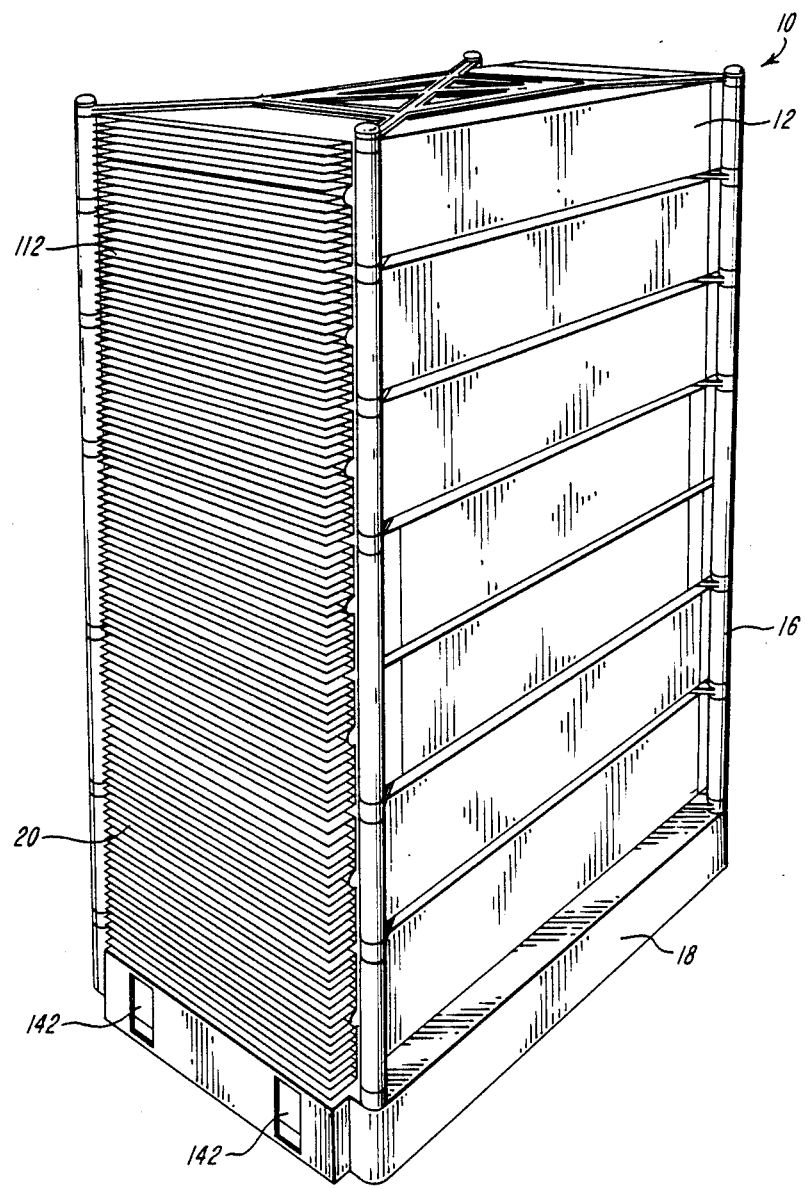
FIG. 1 is a perspective view of a modular computer system according to the invention.
Figure 2:
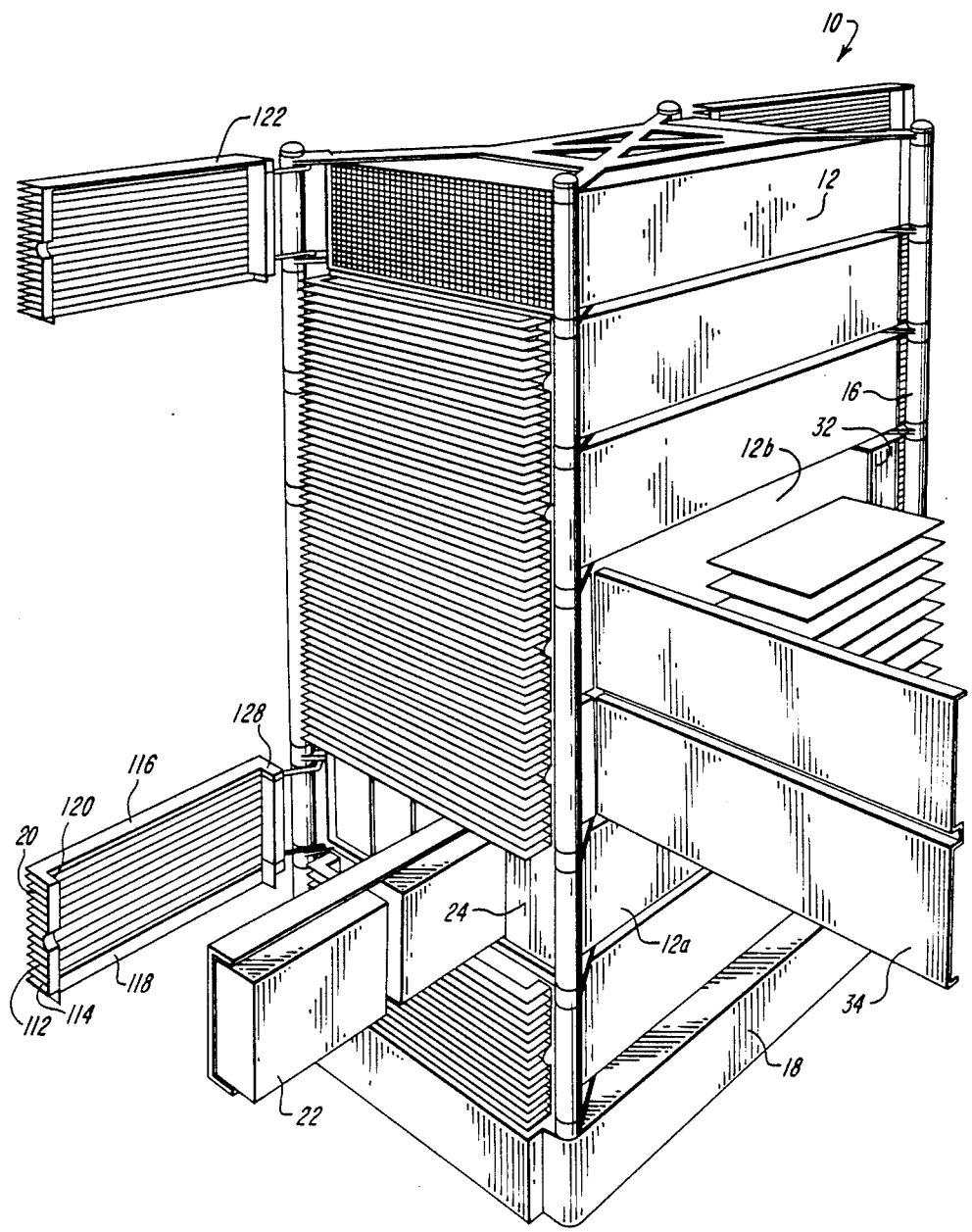
FIG. 2 is a perspective view like FIG. 1, showing some of the doors and side panels of the assembly in the open position.

As shown in FIGS. 1 and 2, a computer system module assembly constructed according to the invention includes a number of equipment enclosures 12 containing computer-related equipment, a number of vertically stacked frame structures 16 for receiving and supporting the enclosures, and a base 18. A number of doors 20 are pivotally mounted on the frame structures.

Figure 3A:
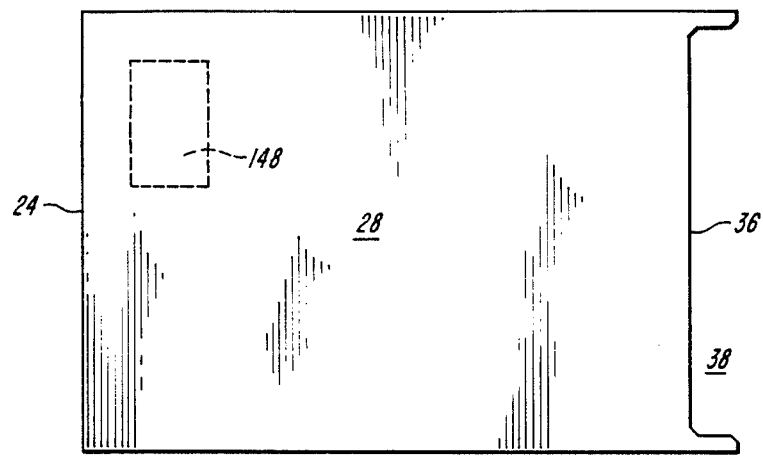
FIGS. 3A, 3B and 3C are top, side and bottom views, respectively, of an equipment enclosure used in the assembly.

The equipment enclosures 12 are independent, modular units. One enclosure construction 12a, useful for containing disk drives 22 and associated power equipment, for example, is shown in FIGS. 3A, B and C. As shown in these figures, the enclosure 12a is of sheet metal construction, having an open front 24, side panels 26, a top panel 28, and a bottom panel 30. As shown in FIG. 2, the disks 22 are insertable and removable from such an enclosure 12a through the open front 24 of the enclosure.

The enclosures 12 may have other forms. For example, an enclosure 12b may be double the standard height of the enclosure 12a just described, and have a closed front panel, but a side panel 32 with a door 34 to provide access to the interior of the enclosure 12b from that side. Such an enclosure 12b is also shown in the assembly of FIG. 2.

The enclosure 12a shown in FIGS. 3A, B and C is approximately 6.5 inches high, 27 inches deep, and 17.5 inches wide. These dimensions represent a standard modular unit size, sufficient for many purposes. However, as the side-opening enclosure 12b also described above shows, when it is appropriate an enclosure of double the basic modular height can be used in the assembly 10. Enclosures that are three or four times the standard enclosure height are also feasible.

The rear portion 36 of the standard enclosure 12a is open, and a cutout portion 38 of the top 28 and bottom 30 panels at the rear provides a cable way at the rear of the assembly 10, for cables extending up and down the assembly to connect electrically the various pieces of equipment in the enclosures 12.

Figure 11:
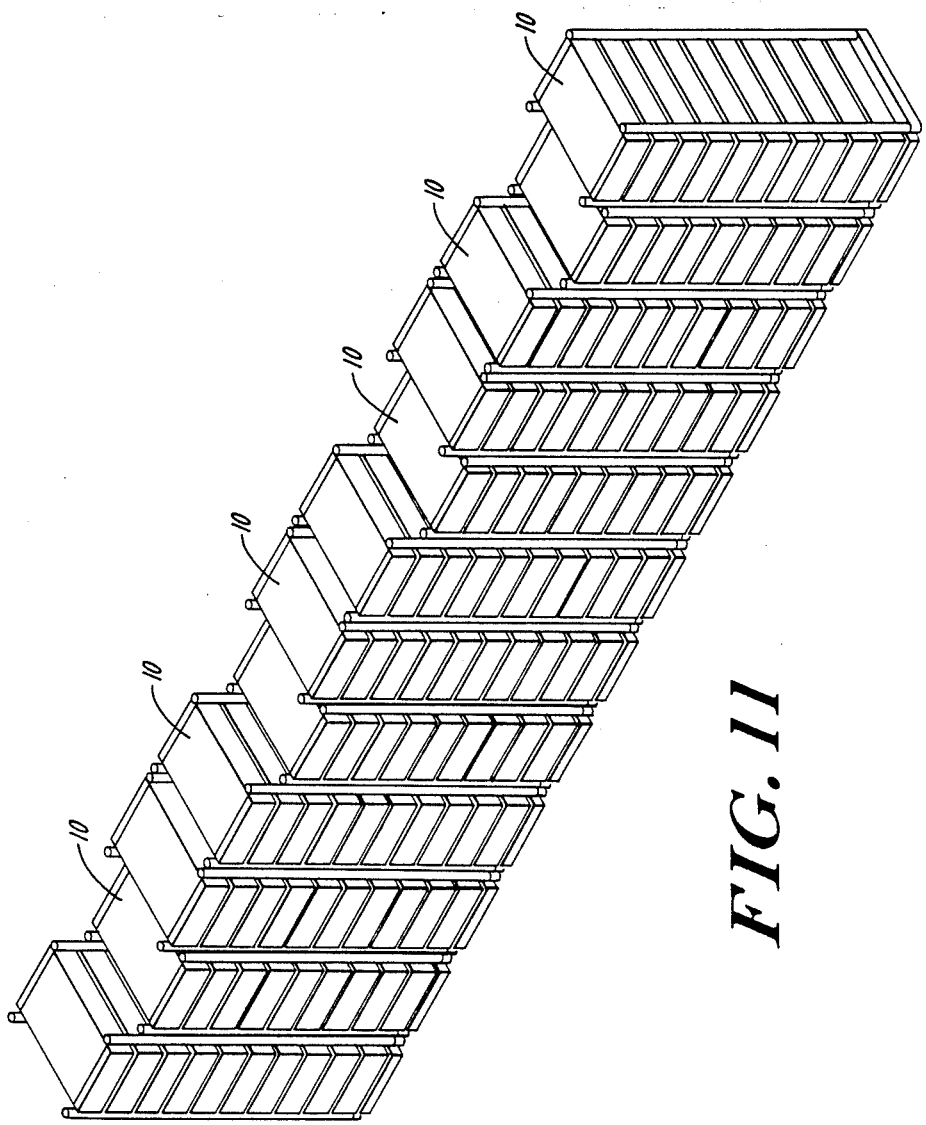
FIG. 11 is a perspective view of several assemblies like the one shown in FIG. 1.

The frame structure of the assembly 10, for receiving the equipment enclosures 12, includes a vertical stack of modular frame structures 16, in any convenient number. The height of the assembly is determined by the number of stacked frame structures 16. Once a maximum number of stacked frame structures, determined by aesthetic or safety reasons, is reached, similar companion assemblies 10 can be created as necessary. Preferably, similar assemblies 10 may be arranged side-by-side as shown in FIG. 11, so that fronts are co-planar along one aisle, and the rears are co-planar and accessible from another, parallel aisle. Provision is made for cable connections between companion assemblies 10, since all the equipment in the equipment enclosures 12 is generally electrically linked in some way or another to some of the other equipment.

The assembly frame structure is exoskeletal. That is, the load-bearing structural elements are outside the equipment enclosures 12, and the vertical structural elements are at corners of the assembly 10, outwardly of the equipment enclosures 12, so that there is virtually unobstructed access to all four sides of the enclosures 12. Of course, depending on the kind of enclosure used, access to all four sides may not be necessary. There is, however, a flexibility in enclosure design that results, so that one enclosure 12a may be accessible from an open front, and another enclosure 12b from doors created in its side, as the various enclosures described above illustrate. It is also unnecessary for the equipment enclosures 12 to bear the weight of other equipment enclosures, so they may be designed from thinner material and be of lighter weight, for example.

The vertical frame structural members 40 of the assembly include sections made up of aluminum structural tubes 42 at the corners of the assembly 10. The height of the tubes 42 will vary, since they correspond to the height of the equipment enclosure 12 to be received within the frame section 16 defined by the tubes. That is, if the equipment enclosure 12 is the smallest standard height, the tubes 42 will also be. If the equipment enclosure is twice the standard height, the tubes will be longer to accomodate them, and so on.

Figure 6:
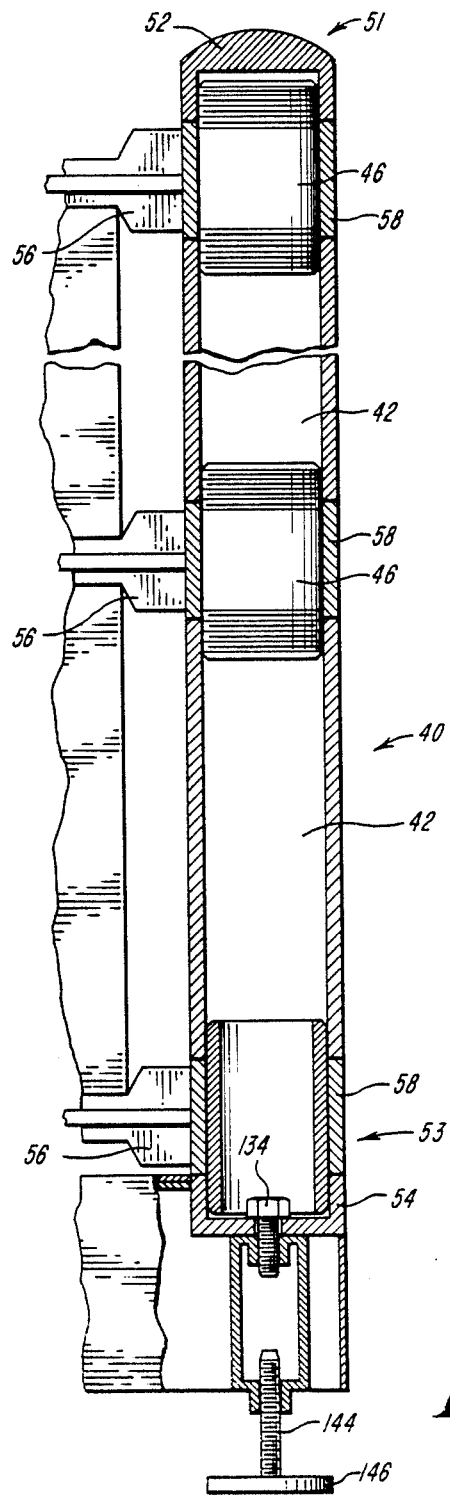
FIG. 6 is a detail, sectional view of the corners of the assembly.
Figure 8:
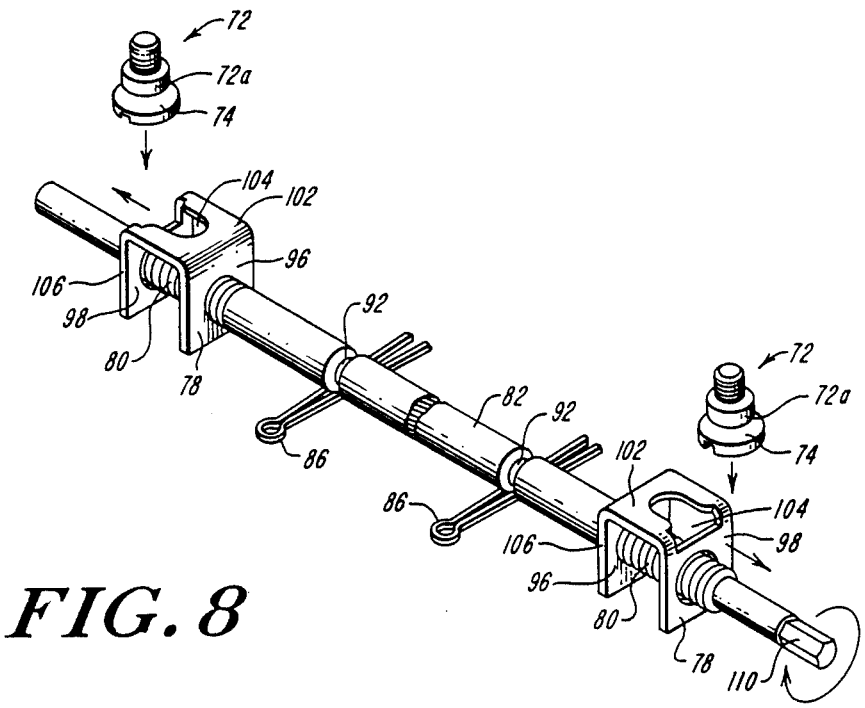
FIG. 8 is a perspective view of the rotatable rod and pawls.
Figure 9A:
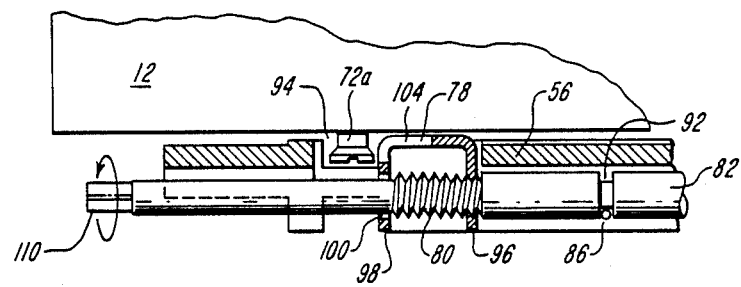
FIG. 9A is a detail, sectional view of a stud on an enclosure and a pawl, in a disengaged position.
Figure 9B:
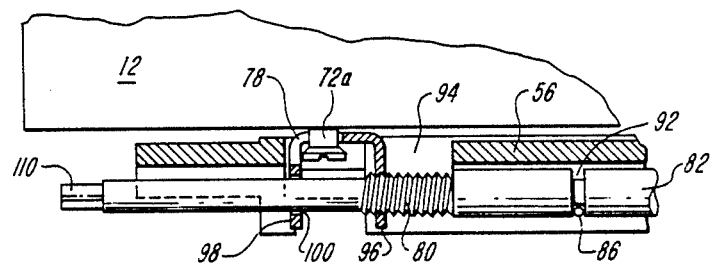
FIG. 9B is a view like 9A, in which the stud and the pawl are engaged.

Each tube 42 is internally threaded at each end portion 44. Tubes 42 are connected to other tubes 42 above or below by way of short tubular couplings 46. The couplings 46 have a midsection 48 and are externally threaded at either end 50 to engage the internal threaded portions 44 of the structural tubes 42 and connect them together. At the top 51 of the assembly 10, a frame cap 52 is threaded onto the coupling 46 at the top of the top tube 42, and at the bottom 53 of the assembly, a frame cup 54 is threaded onto the bottom of the bottom tube's coupling 46 (see FIG. 6).

Figure 5:
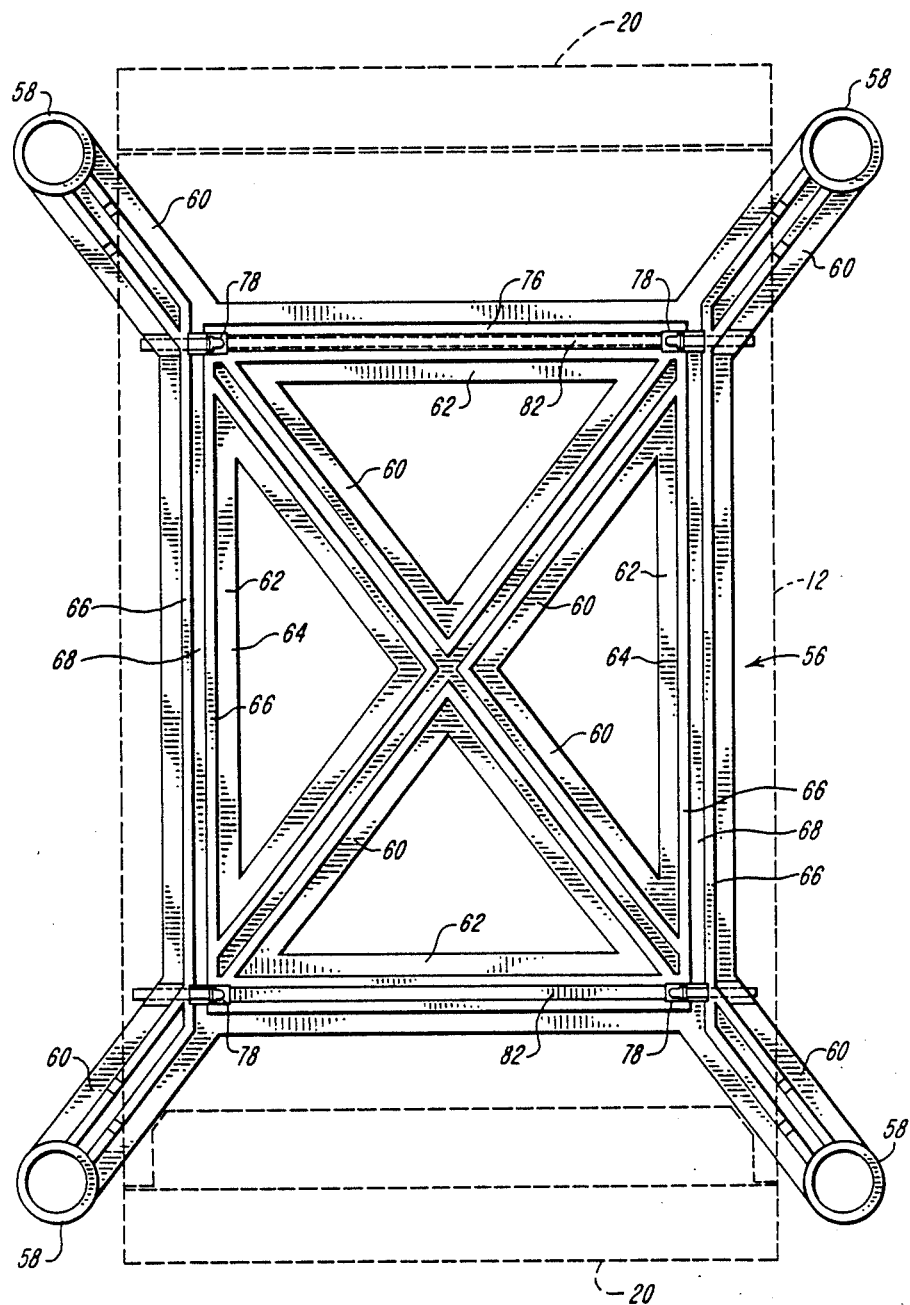
FIG. 5 is a plan view of a horizontal frame member of the assembly with a dotted line indication of an equipment superimposed.
Figure 5A:
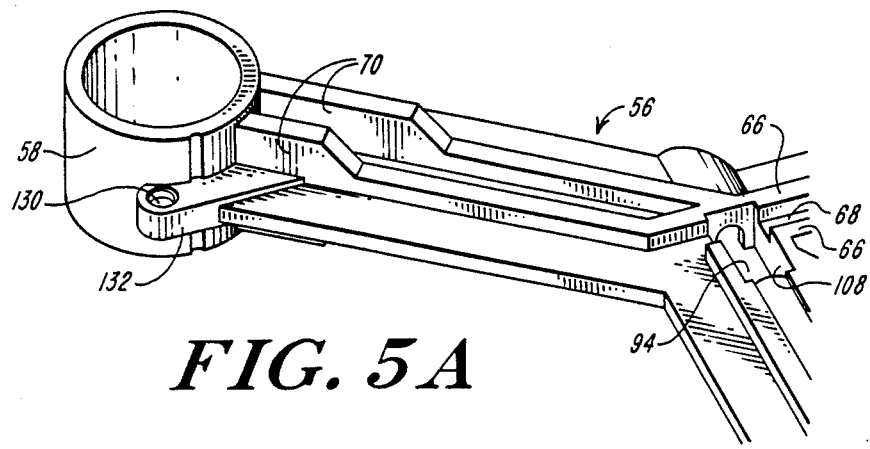
FIG. 5A is a detail, perspective view of a corner of the horizontal frame member.
Figure 7:
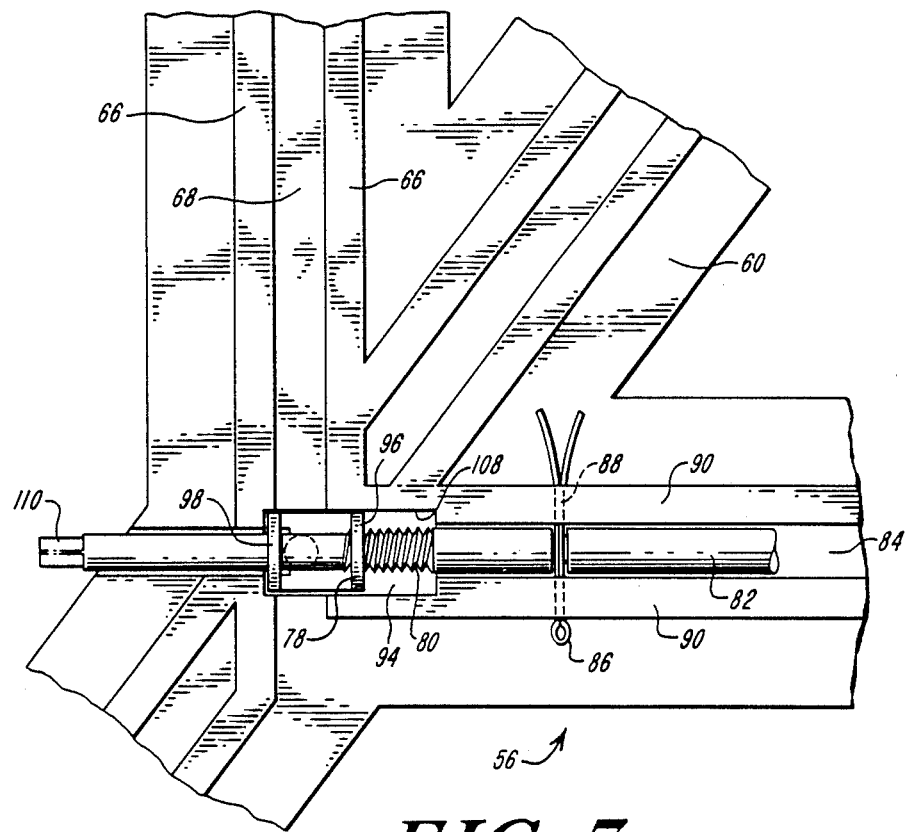
FIG. 7 is a detail, bottom view of a portion of a horizontal frame member, showing a pawl mounted on a rotatable rod.

Extending between the tubes 42 are horizontal frame members 56, shown in FIG. 5. Each horizontal frame member 56 has at each corner (see FIG. 5A) a tube portion 58 adapted to encircle the midsection 48 of the coupling 46 joining sections of the vertical tubes 42 and to be tightly engaged by the adjoining vertical tubes 42. Thus the horizontal frame member 56 becomes an integral part of the assembly structure, providing rigidity for the structure.

Equipment enclosures 12 are slidingly inserted into the assembly created by the horizontal frame member 56 secured to the vertical structural members 40, and are clamped to horizontal frame members 56 after insertion.

Each horizontal frame member 56 includes several horizontal, intersecting, beam-like elements. These include diagonal beams 60 connecting the frame member tube elements 58, and a central rectangular arrangement of beams 62 parallel to the front, rear and sides of the assembly. The central beams 64 that are parallel to the assembly sides have upright pairs of rails 66 on which the equipment enclosures 12 can slide. These pairs of rails 66 also define channels 68 between them. The frame member 56 also includes upright guide rails 70 (see FIG. 5A) for centering an equipment enclosure 12 as it is first slid along the frame member 56.

Both the equipment enclosures 12 and the horizontal frame members 56 have means for engaging each other to clamp the enclosure 12 to the frame 16.

Figure 3B:
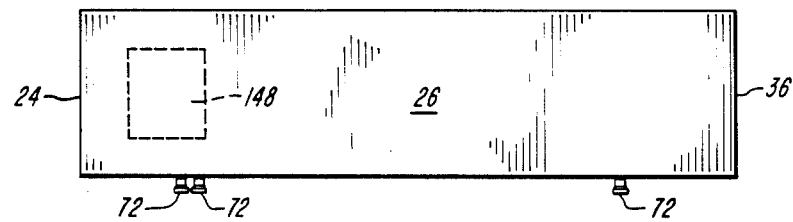
Figure 3C:
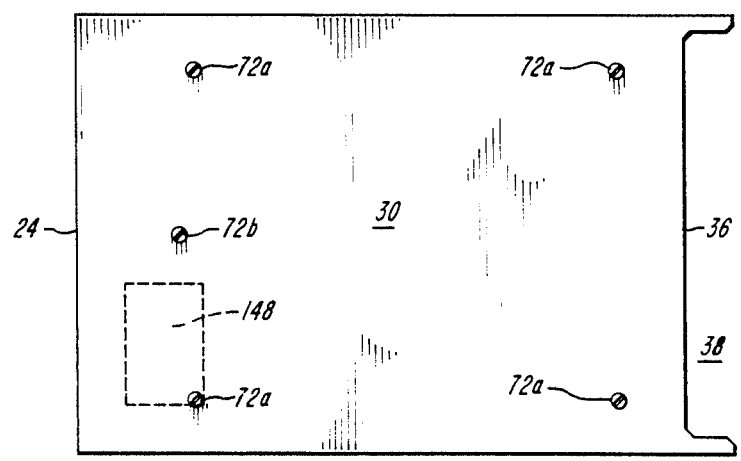

The equipment enclosure 12 (see FIGS. 3B and 3C) has engaging means comprising downwardly extending stud means, in the preferred embodiment described here, consisting of shoulder screws 72 with tapered heads 74. The enclosure illustrated has five such screws, two pairs of aligned engaging screws 72a, and a central front positioning screw 72b.

The aligned engaging screws 72a are located on the enclosure bottom 30 to travel in the frame member rail channels 68 when the enclosure 12 slides atop the rails 66. The front stop screw 72b is located to meet a front rail 76 on the frame member 56 when the enclosure 12 is positioned where it can be clamped to the frame member 56.

As shown in FIGS. 7, 8, 9A and 9B, the frame member engaging means includes movable pawl means 78 mounted on oppositely threaded portions 80 of a rotatable rod 82 captured in the frame member 56. In the preferred embodiment, there are two such rods 82 in the frame member 56 supporting an enclosure 12. Each rod 82 resides in a channel 84 open to the bottom of the frame member 56. Cotter pins 86, insertable through holes 88 in the rails 90 defining the rod channel 84, capture the rod 82 in the channel 84. Circumferential grooves 92 on the rod 82 are located to align with the cotter pins 86, and to position the rod 82 in the rod channel 84 when the cotter pins 86 are inserted.

Two pawls 78 are oppositely threadedly connected to threaded portions 80 of the rod 82 and reside at cutout portions 94 of the frame member 56, so that the pawls 78 may engage the enclosure engaging screws 72a. The rod channels 84 are perpendicular to the channels 68 down which the enclosure screws 72a travel, and the cutout portions 94 of the frame 56 in which the pawls 78 are located are just adjacent the screws 72a when the enclosure 12 is in position to be engaged, or clamped, to the frame member 56.

The pawls 78 are metal elements with downwardly extending walls 96, 98, one 96 of which is threadedly mounted on the threaded portions 80 of the rod 82, the other 98 of which has an unthreaded guide hole 100 through which the rod 82 passes, and an upper horizontal wall 102 with an open-ended slot 104 facing the enclosure screws 72a. The sides 106 of the pawls 78 engage the sides 108 of the cutout portions 94 of the frame member 56. The pawl slot 104 is wide toward the outside and narrows at the inside. The threads on the rod 82 are oriented so that when the rod 82 is turned clockwise from a hexagonal head 110 on one end extending to the edge of the frame member 56, the pawls 78 move outward and capture the enclosure screws 72a in the slot 104 (see FIGS. 9A and 9B). When the rod 82 is turned counterclockwise, the pawls 78 move away from the screws 72a and disengage them.

Only one end of the rod 82 bears the hexagonal head 110 to turn the rod, although both ends could bear such a head. This is so that a clockwise turning of the head 110 is always associated with engaging the enclosure 12 and a counterclockwise turning is always associated with disengaging it.

Perforated doors 20 at the front and the back of the assembly 10 are pivotally mounted on the assembly structure 16. The doors 10 may be one modular unit high, or they can be ganged to operate as doors two or more units high, if the doors 20 are associated with modular equipment enclosures that high. The doors 20 are generally used on the assembly 10 whether they are needed for access or not, to provide a uniform appearance for the fronts and backs of the assemblies and to hide connecting cables.

Each door 20 is molded from plastic, and is formed to have a series of parallel, generally horizontal, slanted vanes 112 to allow air flow easily through the door. About 45% of the door surface is open to air flow. The door sides 114 are solid panels. The door tops 116 and bottoms 118 have cutout portions 120 for electrical cables to pass between equipment enclosures. The top door 20a, however, has a solid top panel 122.

Attachment of the doors 20 to the assembly structure 16 is preferably by angled rods inserted into holes in the door edges 128 and into holes 130 in bosses 132 extending from the horizontal frame member 56 near its tube portions 58. A closure for the doors 20 consists of a biased plunger (not shown) mounted on the door 20 opposite the hinges that can seat in a groove molded into the exterior of the tube elements of the horizontal frame member, to latch the door closed.

Figure 4:
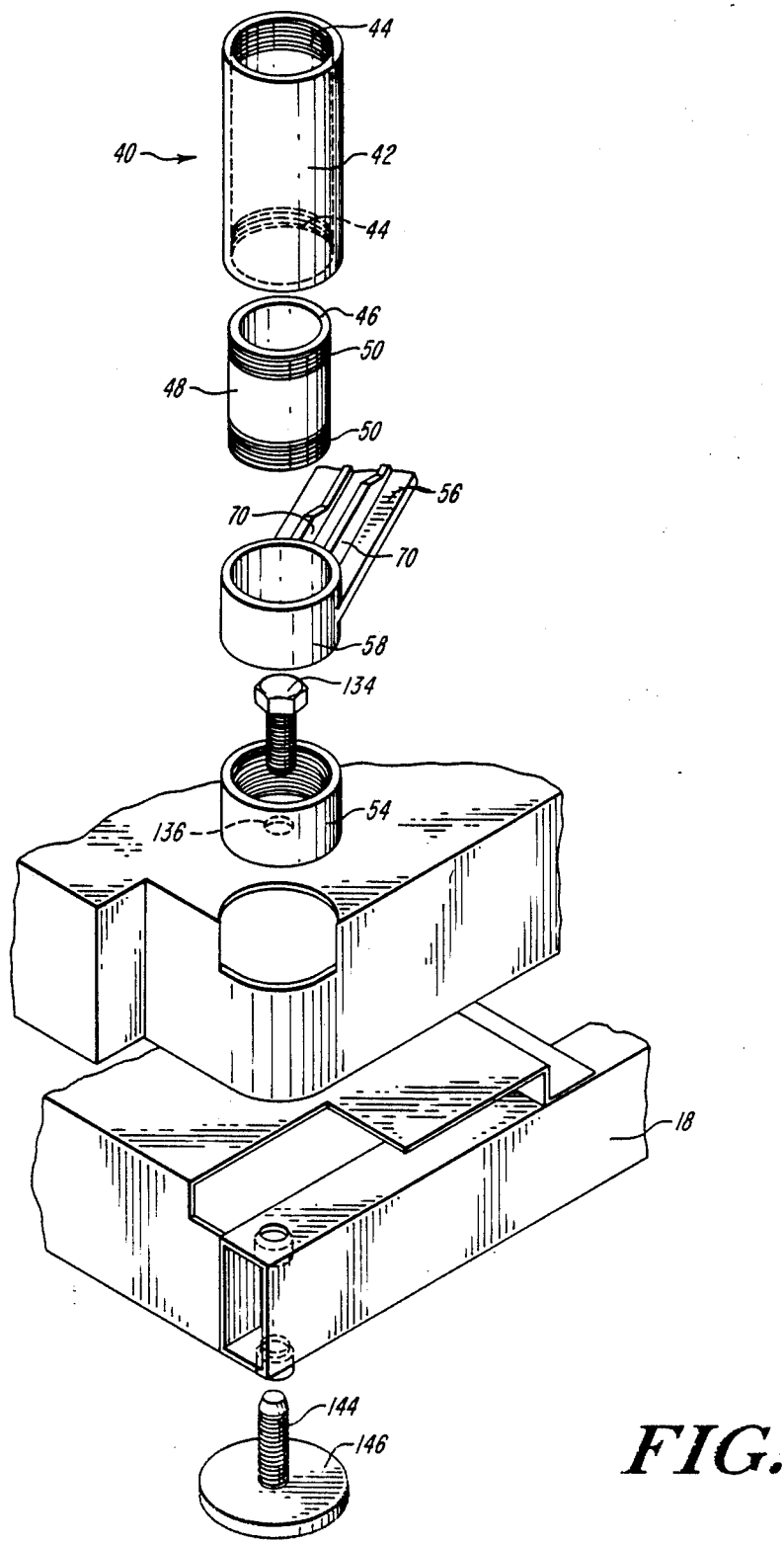
FIG. 4 is a detail, perspective, exploded view of the lower corner of the assembly of FIG. 1.
Figure 10:
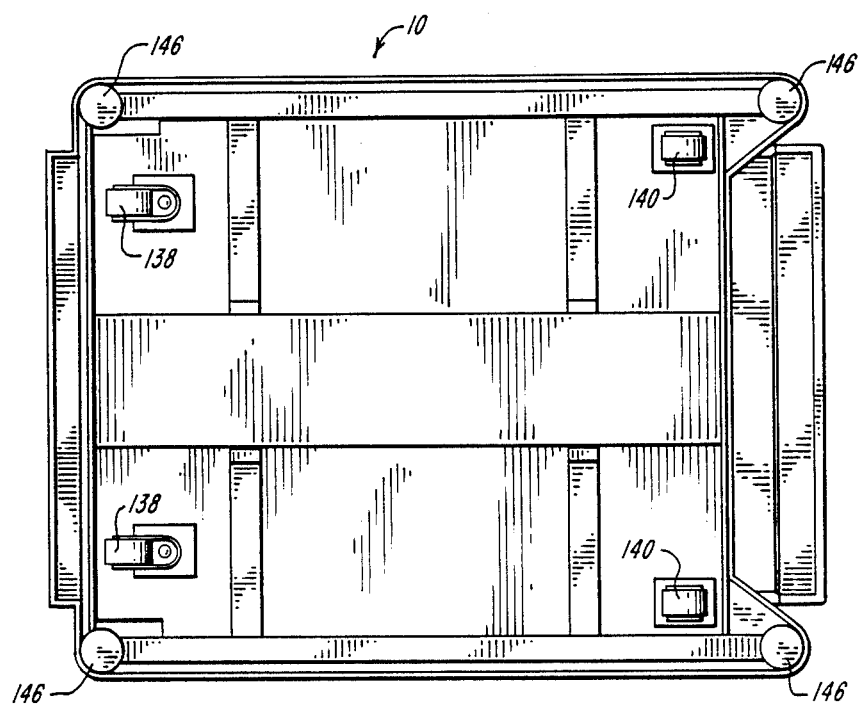
FIG. 10 is a bottom view of the assembly.

Finally, the assembly 10 includes a base 18 for supporting the equipment enclosures 12 and structure 16 and for providing for movement and stability of the assembly 10. As shown in FIG. 4, the structure 16 is mounted on the base 18 by bolts 134 extending through holes 136 in the frame cups 54 on the bottom 53 of the corner structural elements and secured to the base 18. As shown in FIG. 10, the base includes two front swivel casters 138 and two fixed casters 140 of conventional types near the corners for movement of the assembly 10 freely in all directions. The two front swivel casters 138 are also lockable, by means of tabs 142 located at the front of the base 18, to a mode in which they will move only along one axis—front to back. The casters 138 are locked in this mode when the assembly 10 is in position between companion assemblies on either side (see FIG. 11). The assembly 10 can be rolled back and forth for service then without moving against adjacent assemblies 10 due to inadvertent swiveling motion of the casters 138.

The base 18 also includes leveling screws 144 with pads 146, located outwardly of the casters, 138 and 140, that are movable down to contact the floor and give stability to the assembly 10. The leveling screws 144 are located very near the corners of the base 18 where they will have a maximum effect against the assembly 10 tipping over.

The equipment enclosures 12 in an assembly 10 such as the one shown allow equipment for a computer system to be independently engineered and packaged for one of the enclosures. The enclosures may vary somewhat, but they are all based on a standard enclosure envelope. The standard envelope may be doubled and tripled in height, for example. They may have accessible components or perforations in the front and back, to coincide with the perforated doors 20 hinged on the frame 16, so that the doors 20 provide access to the enclosures 12. Or, as one of the enclosures 12b described above had, they may have doors 34 built in the sides 32, where the exoskeletal nature of the frame structure allows doors to be also. In short, access to all sides of the equipment enclosures 12 is possible without moving or sliding the enclosures from the assembly 10.

An important feature of the exoskeletal structure and modular approach of the invention is that air circulating, or other cooling, devices for equipment can be selected to handle only the needs of the particular equipment in a particular modular enclosure, thus minimizing noise from air movement, and minimizing cost. That is, heat interaction with other equipment in the system can be ignored. Also, each modular enclosure 12 is able to receive room temperature air and exhaust slightly heated air, so reliability is enhanced by keeping system component temperature as low as possible.

Preferably, an air circulating device 148 in an enclosure 12 for equipment moves the air through the enclosure 12 from front to back, bringing air in through the front door 20 and front opening 24 of the enclosure, and exhausting it through the rear opening 36 of the enclosure and the rear door 20. Then provision can be made to allow air exhausted all out of one side of the assembly, namely the rear in this case, to be accommodated. The modular enclosures 12 themselves provide well-defined and focused air paths that maximize the effect of air circulating equipment. Of course, if it seems convenient and desirable in certain cases, different air paths can be devised, and entry and exhaust of air through any side of the enclosure can be designed.

The modularity of the enclosures and the assembly structure thus enhances the ease of designing the air circulating aspects. The designer needs to provide only for cooling equipment in the module the designer is attending to.

The preferred embodiment described is only illustrative of the invention. Variations will occur to those skilled in the art, and the invention is not limited to the specific embodiment described but is described by the following claims.

We claim:
1. A modular computer frame assembly comprising:
   a plurality of enclosures,
      each enclosure having a top, a bottom and sides, and containing computer-related equipment, and
   a plurality of vertically stacked frame structures for receiving and supporting said enclosures, said frame structures forming discrete structural modular units,
   each said frame structure comprising a plurality of exterior corner vertical structural members, at least one horizontal frame member secured to said exterior corner vertical structural members and extending horizontally therebetween, said exterior corner vertical structural members including means for attachment to like corner vertical structural members above or below, each said enclosure having enclosure engagement means and each said horizontal frame member having frame engagement means, said enclosure engagement means and said frame engagement means being engageable to each other to clamp said enclosure to said frame member.

2. The assembly of claim 1 in which said horizontal frame member includes means for slidably receiving said enclosure and means for guiding a said enclosure during sliding reception of the enclosure by said horizontal frame member.

3. The assembly of claim 1 in which said enclosure engagement means includes downwardly extending stud means, said horizontal frame member includes channel means for receiving said stud means and said frame engagement means includes movable pawl means located adjacent said channel means for engaging said stud means.

4. The assembly of claim 3, in which said frame engagement means includes a rotatable rod with threaded portions on which said pawl means are mounted, for movement of said pawl means to clamp said stud means when said rod is rotated.

5. The assembly of claim 3 in which said rotatable rod includes means for rotating said rod located at only one location on said rod.

6. The assembly of claim 3 in which said stud means comprise shoulder screws with tapered heads.

7. The assembly of claim 1 further including a plurality of perforated doors, each door pivotally mounted on a said frame structure.

8. The assembly of claim 1 in which at least one of said plurality of enclosures includes air movement means for moving air through said enclosure to cool said computer-related equipment.

9. The assembly of claim 8 which said enclosure includes a first open side through which air enters and a second open side through which air exhausts.

* * * * *